United States Patent
Vavili et al.

(10) Patent No.: US 9,906,449 B2
(45) Date of Patent: Feb. 27, 2018

(54) SYSTEM AND METHOD FOR REDUCED FORWARDING INFORMATION STORAGE

(71) Applicant: Dell Products L.P., Round Rock, TX (US)

(72) Inventors: Vinay Kumar Vavili, Chennai (IN); Chidambaram Ramanathan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/992,729

(22) Filed: Jan. 11, 2016

(65) Prior Publication Data

US 2016/0127237 A1    May 5, 2016

Related U.S. Application Data (63) Continuation of application No. 13/793,107, filed on Mar. 11, 2013, now Pat. No. 9,253,090.

(51) Int. Cl.
*H04L 12/741* (2013.01)
*H04L 29/12* (2006.01)

(52) U.S. Cl.
CPC ........ *H04L 45/745* (2013.01); *H04L 61/6022* (2013.01); *H04L 45/54* (2013.01)

(58) Field of Classification Search
None
See application file for complete search history.

(56) References Cited

U.S. PATENT DOCUMENTS

| | | | | |
|---|---|---|---|---|
| 7,548,563 B1* | 6/2009 | Orr | ...................... | H04L 1/0083 370/349 |
| 8,402,120 B1* | 3/2013 | Perkinson | ............... | H04L 67/16 370/254 |
| 8,549,187 B1* | 10/2013 | Christopher | .......... | H04L 61/103 709/220 |
| 9,253,090 B2* | 2/2016 | Vavili | .................... | H04L 45/745 |
| 2006/0098571 A1* | 5/2006 | Takefman | ............. | H04L 12/427 370/222 |
| 2009/0049199 A1 | 2/2009 | Kuik et al. | | |
| 2010/0002592 A1* | 1/2010 | Effenberger | ............ | H04L 41/00 370/241.1 |
| 2011/0292939 A1* | 12/2011 | Subramaian | ............ | H04L 45/54 370/392 |
| 2013/0051378 A1* | 2/2013 | Gruberman | ........... | H04W 8/245 370/338 |
| 2014/0185611 A1* | 7/2014 | Lie | .......................... | H04L 49/25 370/355 |

\* cited by examiner

*Primary Examiner* — Donald Mills
(74) *Attorney, Agent, or Firm* — Haynes and Boone, LLP (57) ABSTRACT

A system and method for reduced forwarding information storage includes extracting an organizationally unique identifier (OUI) and a MAC part from a MAC address, determining whether information associated with the OUI is stored in an OUI table, determining an OUI index based on the information associated with the OUI and the OUI table when the OUI is stored in the OUI table, generating the OUI index based on the information associated with the OUI when the OUI is not stored in the OUI table, forming a forwarding information table entry including information associated with the OUI index and information associated with the MAC part, and inserting the forwarding information table entry into a forwarding information table.

19 Claims, 9 Drawing Sheets

SYSTEM AND METHOD FOR REDUCED FORWARDING INFORMATION STORAGE

This application is a continuation of U.S. patent application Ser. No. 13/793,107, filed on Mar. 11, 2013, entitled "System and Method for Reduced Forwarding Information Storage", the full disclosure of which is incorporated by reference herein in its entirety.

BACKGROUND

The present disclosure relates generally to information handling systems, and more particularly to reduced forwarding information storage.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Making all of this possible is a vast array of network switching products that make forwarding decisions in order to deliver packets of information from a source system or first network node to a destination system or second network node. Due to the size, complexity, and dynamic nature of these networks, sophisticated network switching products are often required to continuously make forwarding decisions and to update forwarding information, such as media access control (MAC) addresses and/or IP addresses, as network configurations change.

Accordingly, it would be desirable to provide improved network switching products that can store forwarding information efficiently.

SUMMARY

According to one embodiment, a method of forwarding information table insertion includes extracting an organizationally unique identifier (OUI) and a MAC part from a MAC address, determining whether information associated with the OUI is stored in an OUI table, determining an OUI index based on the information associated with the OUI and the OUI table when the OUI is stored in the OUI table, generating the OUI index based on the information associated with the OUI when the OUI is not stored in the OUI table, forming a forwarding information table entry including information associated with the OUI index and information associated with the MAC part, and inserting the forwarding information table entry into a forwarding information table.

In some examples, the forwarding information table is a MAC table. In some examples, the forwarding information table is a layer 3 (L3) table.

According to another embodiment, a method of MAC table lookup includes extracting an organizationally unique identifier (OUI) and a MAC part from a MAC address, determining an OUI index based on information associated with the OUI and an OUI table, combining information associated with the OUI index and information associated with the MAC part, and retrieving a MAC table entry from a MAC table based on the combined information associated with the OUI index and the information associated with the MAC part.

According to yet another embodiment, a method of MAC address resolution includes determining an OUI index and a MAC part based on information associated with an IP address, determining an OUI based on information associated with the OUI index, and combining the OUI and the MAC part to form a MAC address.

According to yet another embodiment, an information handling system includes a network switching unit including one or more processors and memory, an OUI table, and a MAC table. The network switching unit is configured to be coupled to one or more network devices. The network switching unit is configured to extract an organizationally unique identifier (OUI) and a MAC part from a MAC address; determine whether information associated with the OUI is stored in the OUI table; when the OUI is stored in the OUI table, determine an OUI index based on the information associated with the OUI and the OUI table; when the OUI is not stored in the OUI table, generate the OUI index based on the information associated with the OUI and inserting the information associated with the OUI and the OUI index into the OUI table; form a MAC table entry including information associated with the OUI index and information associated with the MAC part; and insert the MAC table entry into the MAC table.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Fast and efficient forwarding of network traffic by an IHS and/or a network switching unit is an important feature of most networks. In order to keep track of forwarding paths and/or other forwarding information, a network switching unit may store use one or more forwarding information structures. In some examples, the network switching unit may maintain a media access control (MAC) table including information necessary to forward network traffic to one or more MAC addresses. In some examples, the network switching unit may maintain a layer 3 (L3) table including information necessary to maintain relationships between Internet Protocol (IP) addresses and MAC addresses.

Many networks today use a 48 BIT format for MAC addresses. In a 48 BIT MAC address, a MAC address is formed using 6 bytes or 48 bits. The MAC address may be used to identify devices at a physical or layer 2 (L2) network layer, such as Ethernet. In some examples, the MAC address is referred to as a hardware address. In some examples, the MAC address may be burned-in or hard-coded to a specific device. To avoid conflicts that might occur on a network, MAC addresses are often assigned hierarchically. The first 3 bytes (24 bits) of the MAC address are assigned based on the manufacturer of the device. These 3 bytes are often referred to as an Organizationally Unique Identifier (OUI). The remaining 3 bytes (24 bits) of the MAC address are assigned by each manufacturer to uniquely identify each device. These 3 bytes are often referred to as a network interface controller (NIC) specific part or a MAC Part.

In some embodiments, such as a data center, a network is created using network switching units and other devices that may often only originate from a limited number of manufacturers. Thus, even though 3 bytes of each MAC address being stored are being dedicated to OUIs, there may be only a small number of different OUIs among the network switching unit and/or other devices in the data center. For network switching units that may be storing forwarding information related to thousands or tens of thousands of MAC addresses, an amount of redundant MAC address information being stored may be extensive. In some examples, memory available for storing forwarding information may be limited. Accordingly, it would be advantageous to store MAC addresses more efficiently.

Figure 1:
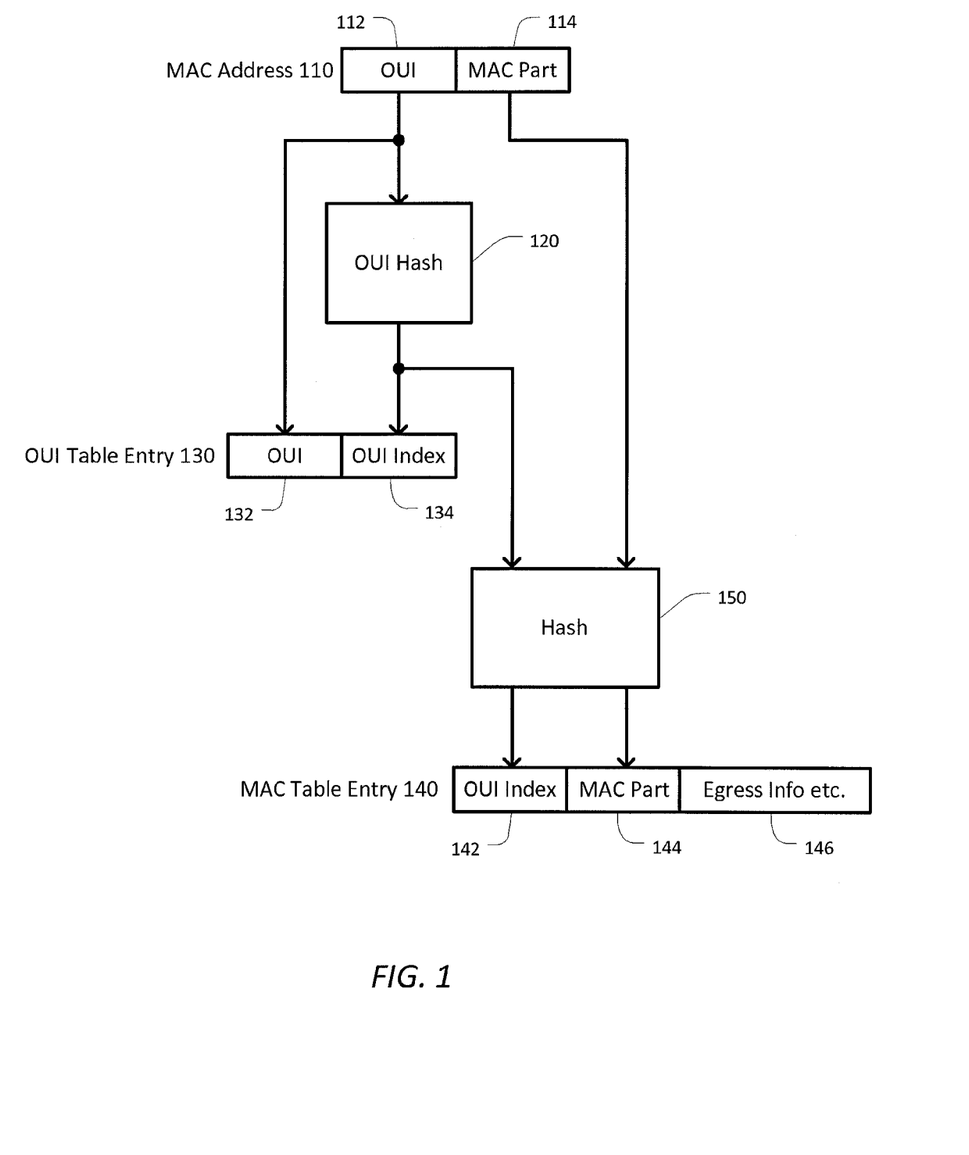
FIG. 1 is a simplified diagram of data flow used to reduce MAC table storage requirements using an OUI Index according to some embodiments.

FIG. 1 is a simplified diagram of data flow used to reduce MAC table storage requirements using an OUI Index according to some embodiments. As shown in FIG. 1, a MAC address 110 is split into an OUI 112 and a MAC Part 114. In some examples, both the OUI 112 and the MAC Part 114 may each be 3 bytes in size. The OUI 112 is processed by an OUI hashing function 120 to generate an OUI Index 134. In some examples, the OUI hashing function 120 may create a different OUI Index 134 for each OUI 112 it receives. In some examples, the OUI Index 134 may be represented using fewer than 3 bytes. In some examples, a number of bits used to represent the OUI Index 134 may be configurable. In some examples, the number of bits used to represent the OUI Index 134 may be based on a number of different OUIs 112 that the OUI hashing function 120 may be asked to process. The OUI 112 and the OUI Index 134 are then combined to form an OUI table entry 130. The OUI table entry 130 includes an OUI 132 and the OUI Index 134. In some examples, the OUI 132 may be the same as the OUI 112. In some examples, the OUI table entry 130 may be stored in an OUI table.

The OUI Index 134 generated by the OUI hashing function 120 is also used in a MAC table entry 140. The MAC table entry 140 includes an OUI Index 142, a MAC Part 144, and additional information 146 associated with the MAC address 110. In some embodiments, the OUI Index 134 and the MAC Part 114 may be processed by further hashing 150 to form the OUI Index 142 and the MAC Part 144. In some embodiments, the further hashing 150 may be omitted and the OUI Index 142 may be the same as the OUI Index 134, and the MAC Part 144 may be the same as the MAC Part 114. In some examples, the additional information 146 may include egress information such as an egress port ID used to forward network traffic toward the MAC address 110.

According to some embodiments, an amount of memory saved by storing the OUI Index 142 rather than the OUI 112 in a MAC table may be significant. In some examples, when the OUI 112 is 3 bytes (24 bits) in length and the OUI Index 142 is 6 bits in length, 18 bits per MAC table entry 140 may be saved and hence less storage is required for the MAC table. When the OUI Index 142 is 6 bits in length the OUI table requires $2^6$=64 OUI table entries of 6+24 bits for a total storage of 1920 bits. In some examples, when the MAC table includes 1000 entries, this may save 18,000 bits in the MAC table less the 1920 bits of the OUI table for a net savings of over 16,000 bits or 2000 bytes. In some examples, when the MAC table includes 10,000 entries a net savings of nearly 180,000 bits or over 20,000 bytes may be achieved.

Figure 2:
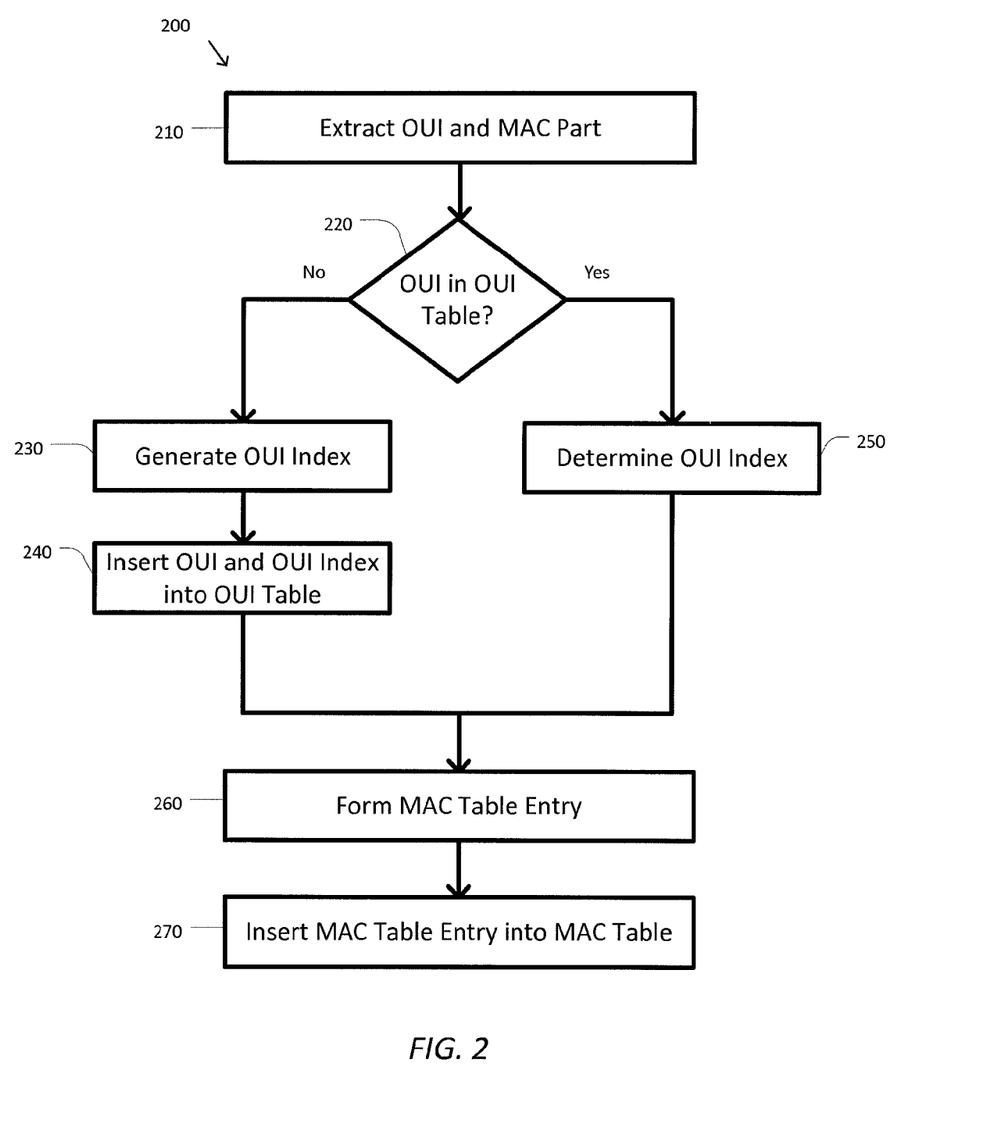
FIG. 2 is a simplified diagram of a method of MAC table insertion using an OUI Index according to some embodiments.

FIG. 2 is a simplified diagram of a method 200 of MAC table insertion using an OUI Index according to some embodiments. As shown in FIG. 2, the method 200 includes a process 210 for extracting an OUI and a MAC Part, a process 220 for determining if the OUI is in an OUI table, a process 230 for generating an OUI Index, a process 240 for inserting the OUI and the OUI Index into the OUI table, a process 250 for determining the OUI Index, a process 260 for forming a MAC table entry, and a process 270 for inserting the MAC table entry into a MAC table. According to certain embodiments, the method 200 of MAC table insertion using an OUI Index can be performed using variations among the processes 210-270 as would be recognized by one of ordinary skill in the art. According to some embodiments, the process 240 may be omitted. In some embodiments, one or more of the processes 210-270 of method 200 may be implemented, at least in part, in the form of executable code stored on non-transient, tangible, machine readable media that when run by one or more processors (e.g., one or more processors in a network switching unit) may cause the one or more processors to perform one or more of the processes 210-270.

At the process 210, an OUI and a MAC Part are extracted. The OUI and the MAC Part are extracted from their respective portions of a MAC address for which a MAC table entry is needed in a MAC table. In some examples, the OUI is a first 3 bytes of a 48 bit MAC address. In some examples, the MAC Part is a last 3 bytes of the 48 bit MAC address. In some examples, the OUI may be the OUI 112, the MAC Part may be the MAC Part 114, and the MAC address may be the MAC address 110.

At the process 220, it is determined whether the OUI is in an OUI table. When the OUI is already in the OUI table, an OUI index corresponding to the OUI is already known and can be determined using the process 250. When the OUI is not in the OUI table, the OUI index corresponding to the OUI needs to be generated starting at the process 230. In some examples, a table lookup using the OUI may be used to determine whether the OUI is in the OUI table.

At the process 230, the OUI Index is generated. The OUI Index is generated based on the OUI extracted during the process 210. In some examples, a hashing function may be used to generate the OUI Index. In some examples, the hashing function may be the OUI hashing function 120.

At the optional process 240, the OUI and the OUI Index are inserted into the OUI table. An OUI table entry may be generated using the OUI extracted during the process 210 and the OUI Index generated during the process 230. The OUI table entry includes the OUI and the OUI Index. In some examples, the OUI table entry is the OUI table entry 130. The OUI table entry is then inserted into the OUI table. In some examples, the OUI table entry in the OUI table may be used during subsequent table lookups associated with the process 220. In some examples, the OUI table entry in the OUI table may be used for other purposes. In some examples, the OUI table may be indexed and/or keyed based on the OUI. In some examples, the OUI table may be indexed and/or keyed based on the OUI Index. In some examples, the process 240 may be omitted when it is not desired store the OUI Index in the OUI table.

At the process 250, the OUI Index is determined. In some examples, when the OUI extracted during the process 210 already has an existing entry in the OUI table, the existing entry may be used to determine the OUI Index. In some examples, when the OUI Index is found in the existing entry it is not necessary to regenerate the OUI Index.

At the process 260, a MAC table entry is formed. The MAC table entry includes the OUI Index either generated during the process 230 or determined during the process 250, the MAC Part extracted during the process 210, and additional information associated with the MAC address. In some examples, the OUI Index and the MAC Part may be processed by further hashing before being included in the MAC table entry. In some examples, the additional information may include egress information such as an egress port ID used to forward network traffic toward the MAC address. In some examples, the MAC table entry may be the MAC table entry 140.

At the process 270, the MAC table entry is inserted into a MAC table. In some examples, the MAC table may be indexed and/or keyed based on the OUI Index and/or the MAC Part. In some examples, the MAC table entry is inserted into the MAC table for reference later.

Figure 3:
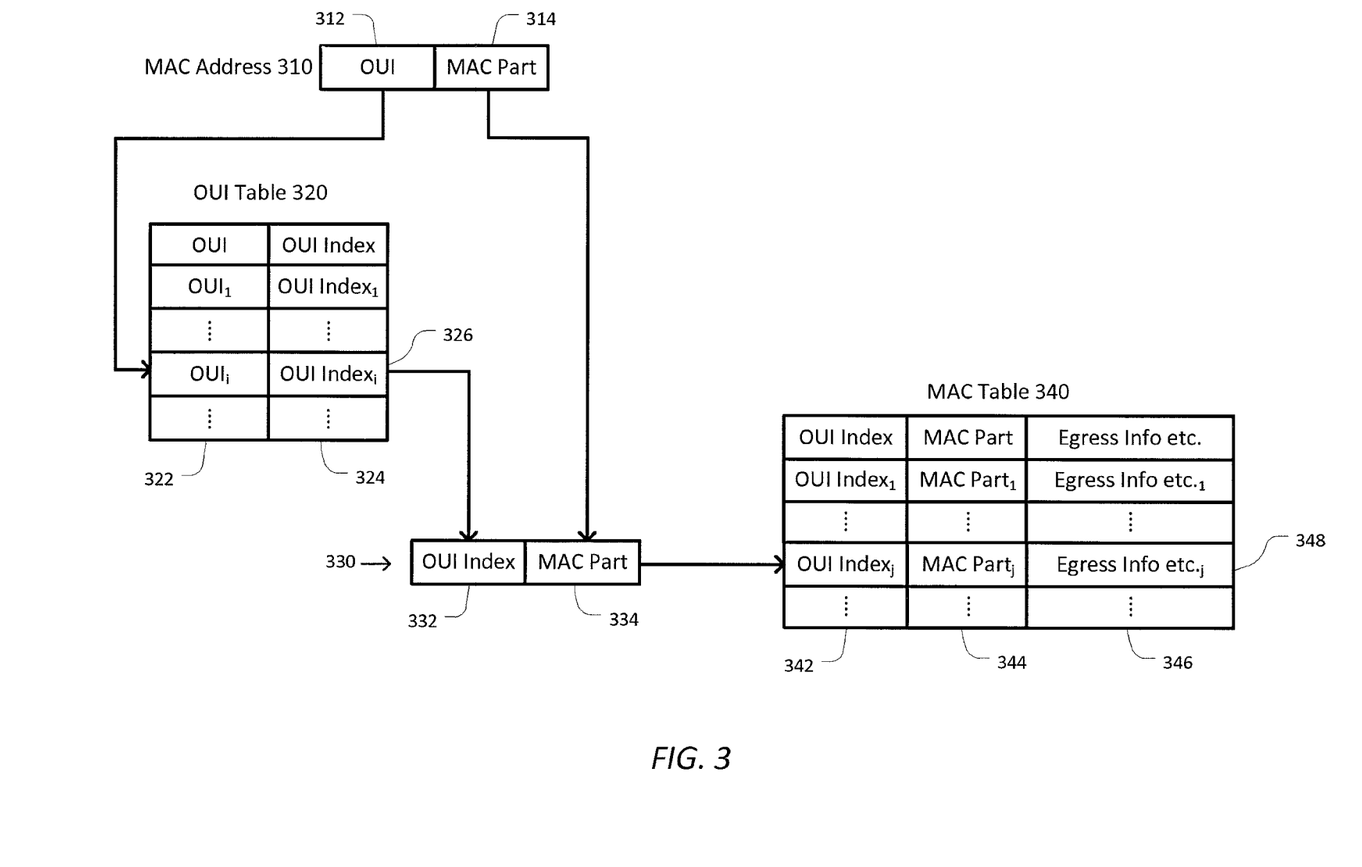
FIG. 3 is a simplified diagram of data flow used to lookup a MAC table entry according to some embodiments.

FIG. 3 is a simplified diagram of data flow used to lookup a MAC table entry according to some embodiments. As shown in FIG. 3, a MAC address 310 is split into an OUI 312 and a MAC Part 314. In some examples, both the OUI 312 and the MAC Part 314 may each be 3 bytes in size. The OUI 312 is used for a table lookup on an OUI table 320. The OUI table 320 includes a first column 322 for OUI values and a second column 324 with corresponding OUI Index values. In some examples, the OUI table 320 may be indexed and/or keyed based on OUI values in the first column 322. In some examples, the OUI table 320 may be indexed and/or keyed based on OUI Index values in the second column 324. The OUI table 320 may include one or more OUI table entries with an OUI value (e.g., $OUI_i$) and a corresponding OUI Index value (e.g., OUI Index$_i$). The OUI 312 may be matched to an OUI value in an OUI table entry and a corresponding OUI Index value retrieved. In some examples, the OUI table entries may have been inserted during one or more applications of the process 240. As shown in FIG. 3, the OUI 312 is matched to an ith entry 326 of the OUI table 320. The OUI Index$_i$ retrieved from the OUI table entry 326 is combined with the MAC Part 314 to form a MAC table key 330. The MAC table key 330 includes an OUI Index 332 and a MAC Part 334. In some examples, the OUI Index 332 may be the OUI Index$_i$, and the MAC Part 334 may be the MAC Part 314. In some examples, one or more of the OUI Index$_i$ and the MAC Part 314 may be hashed before forming the MAC table key 330.

The MAC table key 330 is then used to lookup a MAC table entry in a MAC table 340. The MAC table 340 includes a first column 342 for OUI Index values, a second column 344 for MAC Part values, and a third column 346 for additional information associated with a corresponding MAC address. In some examples, the MAC table 340 may be indexed and/or keyed based on OUI Index values in the first column 342 and/or MAC Part values in the second column 344. The MAC table 340 may include one or more MAC table entries with an OUI Index value (e.g., OUI Index), a MAC Part value (e.g., MAC Part), and information corresponding to a MAC address (e.g., Egress info etc.). The MAC table key 330 may be matched to an OUI Index value and a MAC Part value in a MAC table entry and a corresponding MAC address information retrieved. In some examples, the OUI Index 332 and the MAC Part 334 may be matched to the OUI Index value and the MAC Part value. In some examples, the MAC table entries may have been inserted during one or more applications of the process 270. As shown in FIG. 3, the MAC table key 330 is matched to a jth entry 348 of the MAC table 340. The corresponding MAC address information (i.e., Egress info etc.$_j$) is then retrieved from the MAC table 340.

Figure 4:
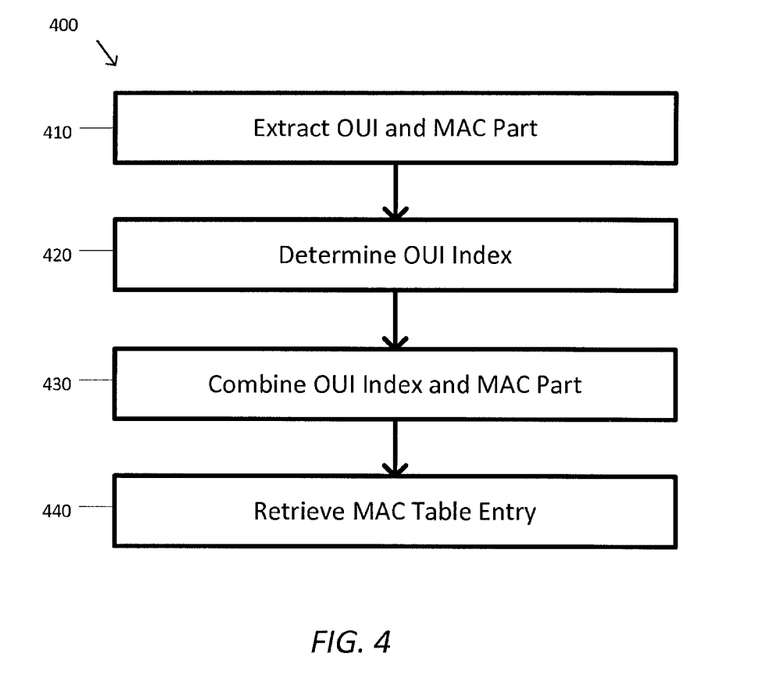
FIG. 4 is a simplified diagram of a method of MAC table lookup using an OUI Index according to some embodiments.

FIG. 4 is a simplified diagram of a method 400 of MAC table lookup using an OUI Index according to some embodiments. As shown in FIG. 4, the method 400 includes a process 410 for extracting an OUI and a MAC Part, a process 420 for determining an OUI Index, a process 430 for combining the OUI Index and the MAC Part, and a process 440 for retrieving a MAC table entry. According to certain embodiments, the method 400 of MAC table lookup using an OUI Index can be performed using variations among the processes 410-440 as would be recognized by one of ordinary skill in the art. In some embodiments, one or more of the processes 410-440 of method 400 may be implemented, at least in part, in the form of executable code stored on non-transient, tangible, machine readable media that when run by one or more processors (e.g., one or more processors in a network switching unit) may cause the one or more processors to perform one or more of the processes 410-440.

At the process 410, an OUI and a MAC Part are extracted. The OUI and the MAC Part are extracted from their respective portions of a MAC address for which a MAC table entry may be found in a MAC table. In some examples, the OUI is a first 3 bytes of a 48 BIT MAC address. In some examples, the MAC Part is a last 3 bytes of the 48 BIT MAC address. In some examples, the OUI may be the OUI 312, the MAC Part may be the MAC Part 314, and the MAC address may be the MAC address 310.

At the process 420, the OUI Index is determined. In some examples, the OUI extracted during the process 410 may be used to lookup the OUI Index in an OUI table. In some examples, the OUI Index may be the OUI Index 332 and the OUI table may be the OUI table 320. In some examples, the OUI Index may be less than 3 bytes in size. In some examples, a number of bits used to represent the OUI Index may be configurable.

At the process 430, the OUI Index and the MAC Part are combined. In some examples, the OUI Index and the MAC Part are combined to form a MAC table key. In some examples, one or more of the OUI Index and the MAC Part may be hashed before they are combined to form the MAC table key. In some examples, the MAC table key may be the MAC table key 330.

At the process 440, a MAC table entry is retrieved. In some examples, the MAC table key formed during the process 430 may be used to lookup the MAC table entry in a MAC table. In some examples, the MAC table may be the MAC table 340. In some examples, the MAC table entry may be the MAC table entry 348. In some examples, the MAC table may be indexed and/or keyed based on OUI Index values and/or MAC Part values. In some examples, the MAC table entry retrieved may be used to forward network traffic. In some examples, the MAC table entry retrieved may be updated.

According to some embodiments, the method 400 may require more time to complete when compared to a lookup of a MAC table entry when an OUI Index is not used. In some examples, the additional time may be required due to an amount of time to determine the OUI Index during the process 420. In some examples, the additional time may be relatively minor when compared to a time necessary to transmit network traffic when the network traffic is forwarded. In some examples, the additional time is reduced by implementing the process 420 using hardware. In some examples, the hardware may include a content-addressable memory (CAM) implementing the OUI table.

Figure 5:
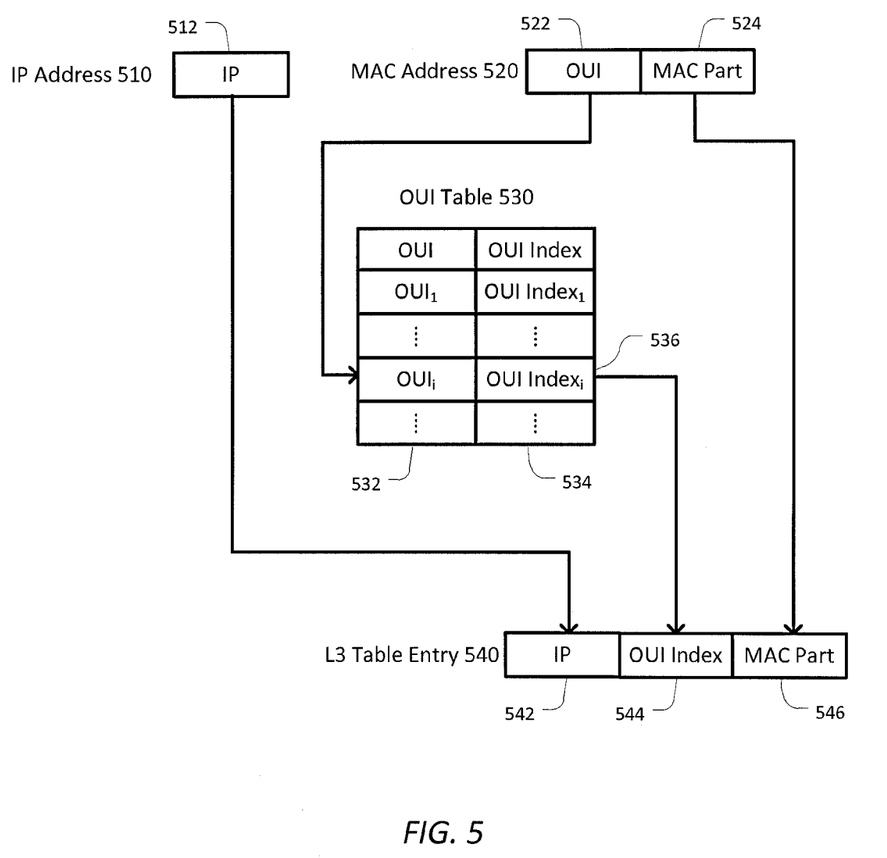
FIG. 5 is a simplified diagram of data flow used to reduce L3 table storage requirements using an OUI Index according to some embodiments.

FIG. 5 is a simplified diagram of data flow used to reduce L3 table storage requirements using an OUI Index according to some embodiments. As shown in FIG. 5, an IP address 510 includes an IP value 512. A MAC address 520 is split into an OUI 522 and a MAC Part 524. In some examples, both the OUI 522 and the MAC Part 524 may each be 3 bytes in size. The OUI 522 is used for a table lookup on an OUI table 530. The OUI table 530 includes a first column 532 for OUI values and a second column 534 with corresponding OUI Index values. In some examples, the OUI table 530 may be indexed and/or keyed based on OUI values in the first column 532. In some examples, the OUI table 530 may be indexed and/or keyed based on OUI Index values in the second column 534. The OUI table 530 may include one or more OUI table entries with an OUI value (e.g., OUI$_i$) and a corresponding OUI Index value (e.g., OUI Index$_i$). The OUI 522 may be matched to an OUI value in an OUI table entry and a corresponding OUI Index value retrieved. In some examples, the OUI table entries may have been inserted during one or more applications of the process 240. In some examples, the OUI table 530 may be the OUI table 320. As shown in FIG. 5, the OUI 522 is matched to an ith entry 536 of the OUI table 530. The IP value 512, the OUI Index$_i$ retrieved from the OUI table entry 536, and the MAC Part 524 are combined to form a L3 table entry 540. The L3 table entry 540 includes an IP value 542, an OUI Index 544, and a MAC Part 546. In some examples, the IP value 542 may be the IP value 512, the OUI Index 544 may be the OUI Index$_i$, and the MAC Part 546 may be the MAC Part 524. In some examples, one or more of the IP value 512, the OUI Index$_i$, and the MAC Part 524 may be hashed before forming the L3 table entry 540.

According to some embodiments, an amount of memory saved by storing the OUI Index 544 rather than the OUI 522 in the L3 table may be significant. In some examples, when the OUI 522 is 3 bytes (24 bits) in length and the OUI Index 544 is 6 bits in length, 18 bits per L3 table entry 540 may be saved and hence less storage required for the L3 table. When the OUI Index 544 is 6 bits in length the OUI table 540 requires $2^6$=64 OUI table entries of 6+24 bits for a total storage of 1920 bits. In some examples, when the L3 table includes 1000 entries, this may save 18,000 bits in the L3 table less the 1920 bits of the OUI table 530 for a net savings of over 16,000 bits or 2000 bytes. In some examples, when the L2 table includes 10,000 entries a net savings of nearly 180,000 bits or over 20,000 bytes may be achieved.

Figure 6:
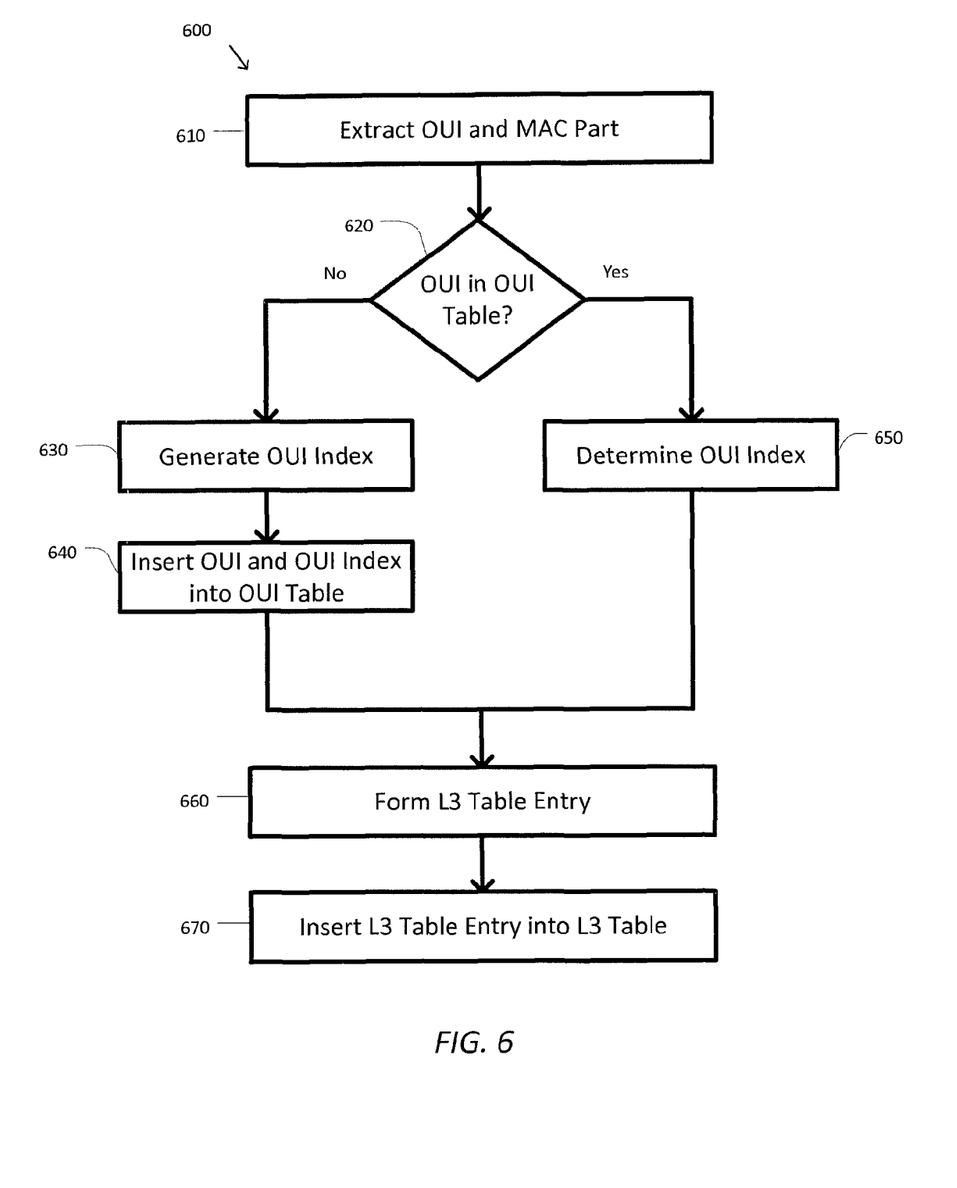
FIG. 6 is a simplified diagram of a method of L3 table insertion using an OUI Index according to some embodiments.

FIG. 6 is a simplified diagram of a method 600 of L3 table insertion using an OUI Index according to some embodiments. As shown in FIG. 6, the method 600 includes a process 610 for extracting an OUI and a MAC Part, a process 620 for determining if the OUI is in an OUI table, a process 630 for generating an OUI Index, a process 640 for inserting the OUI and the OUI Index into the OUI table, a process 650 for determining the OUI Index, a process 660 for forming a L3 table entry, and a process 670 for inserting the L3 table entry into a L3 table. According to certain embodiments, the method 600 of L3 table insertion using an OUI Index can be performed using variations among the processes 610-670 as would be recognized by one of ordinary skill in the art. According to some embodiments, the process 640 may be omitted. In some embodiments, one or more of the processes 610-670 of method 600 may be implemented, at least in part, in the form of executable code stored on non-transient, tangible, machine readable media that when run by one or more processors (e.g., one or more processors in a network switching unit) may cause the one or more processors to perform one or more of the processes 610-670.

At the process 610, an OUI and a MAC Part are extracted. The OUI and the MAC Part are extracted from their respective portions of a MAC address for which a L3 table entry is needed in a L3 table. In some examples, the OUI is a first 3 bytes of a 48 BIT MAC address. In some examples, the MAC Part is a last 3 bytes of the 48 BIT MAC address. In some examples, the OUI may be the OUI 112 and/or the OUI 512, the MAC Part may be the MAC Part 114 and/or the MAC Part 524, and the MAC address may be the MAC address 110 and/or the MAC address 520.

At the process 620, it is determined whether the OUI is in an OUI table. When the OUI is already in the OUI table, an OUI index corresponding to the OUI is already known and can be determined using the process 650. When the OUI is not in the OUI table, the OUI index corresponding to the OUI needs to be generated starting at the process 630. In some examples, a table lookup using the OUI may be used to determine whether the OUI is in the OUI table. In some examples, the OUI table may be the same table as used during the method 200 and/or the method 400.

At the process 630, the OUI Index is generated. The OUI Index is generated based on the OUI extracted during the process 610. In some examples, a hashing function may be used to generate the OUI Index. In some examples, the hashing function may be the OUI hashing function 120.

At the optional process 640, the OUI and the OUI Index are inserted into the OUI table. An OUI table entry may be generated using the OUI extracted during the process 610 and the OUI Index generated during the process 630. The OUI table entry includes the OUI and the OUI Index. In some examples, the OUI table entry is the OUI table entry 130. The OUI table entry is then inserted into the OUI table. In some examples, the OUI table entry in the OUI table may be used during subsequent table lookups associated with the process 620. In some examples, the OUI table entry in the OUI table may be used for other purposes. In some examples, the OUI table may be indexed and/or keyed based on the OUI. In some examples, the OUI table may be indexed and/or keyed based on the OUI Index.

At the process 650, the OUI Index is determined. In some examples, when the OUI extracted during the process 610 already has an existing entry in the OUI table, the existing entry may be used to determine the OUI Index. In some examples, when the OUI Index is found in the existing entry it is not necessary to regenerate the OUI Index.

At the process 660, a L3 table entry is formed. The L3 table entry includes an IP value, the OUI Index either generated during the process 630 or determined during the process 650, and the MAC Part extracted during the process 610. In some examples, one or more of the IP value, the OUI Index, and the MAC Part may be processed by further hashing before being included in the L3 table entry. In some examples, the L3 table entry may be the L3 table entry 540.

At the process 670, the L3 table entry is inserted into a L3 table. In some examples, the L3 table may be indexed and/or keyed based on the IP value. In some examples, the L3 table entry is inserted into the L3 table for reference later. In some examples, the L3 table may be maintained for use with an Address Resolution Protocol (ARP).

Figure 7:
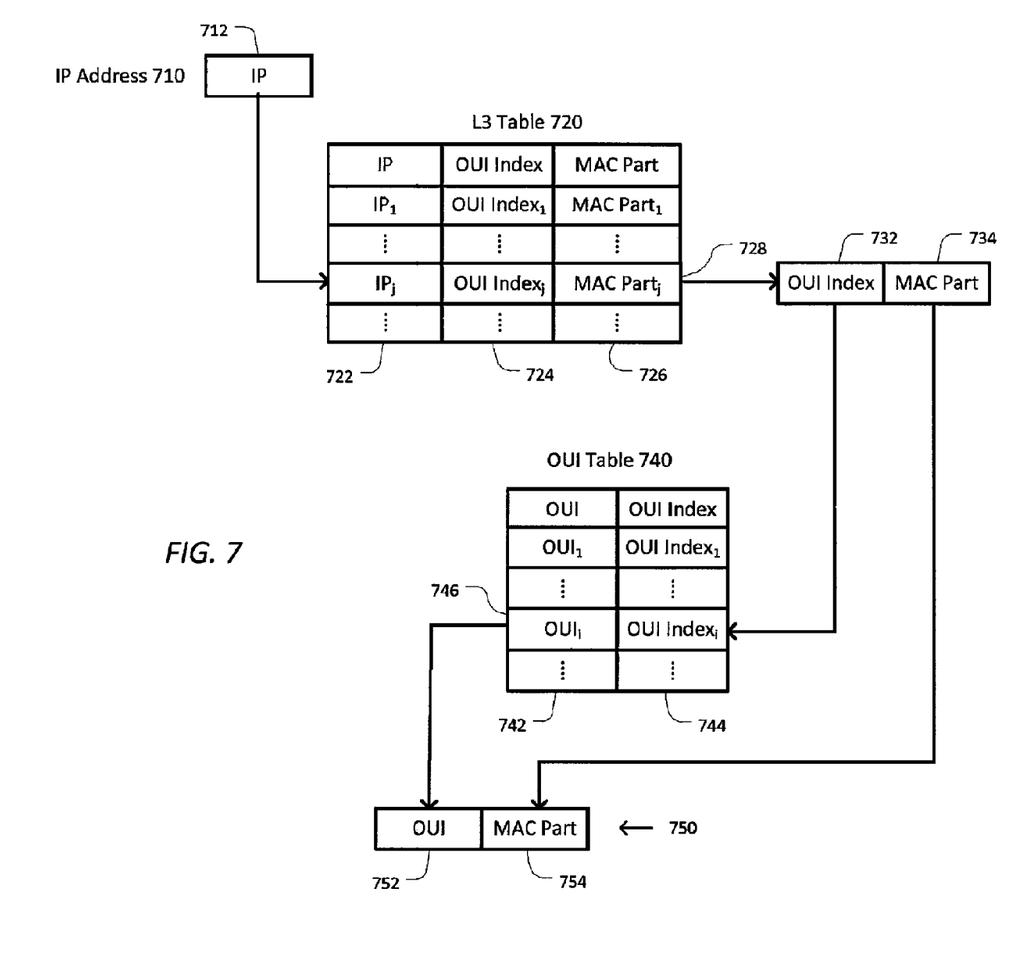
FIG. 7 is a simplified diagram of data flow used to resolve a MAC address from an IP address according to some embodiments.

FIG. 7 is a simplified diagram of data flow used to resolve a MAC address from an IP address according to some embodiments. As shown in FIG. 7, an IP address 710 includes an IP value 712. The IP value 712 is used for a table lookup on an L3 table 720. The L3 table 720 includes a first column 722 for IP values, a second column 724 with corresponding OUI Index values, and a third column 726 with corresponding MAC Part values. In some examples, the L3 table 720 may be indexed and/or keyed based on the IP values in the first column 722. The L3 table 720 may include one or more L3 table entries with an IP value (e.g., IP) and a corresponding OUI Index value (e.g., OUI Index) and MAC Part value (e.g., MAC Part). The IP value 712 may be matched to an IP value in a L3 table entry and a corresponding OUI Index value and MAC Part value retrieved. In some examples, the L3 table entries may have been inserted during one or more applications of the process 670. As shown in FIG. 7, the IP value 712 is matched to a jth entry 728 of the L3 table 720.

After the lookup in the L3 table 720, an OUI Index 732 and a MAC Part 734 are extracted from the L3 table entry 728. In some examples, the OUI Index 732 may be less than 3 bytes in size. In some examples, a number of bits used to represent the OUI Index 732 may be configurable. In some examples, MAC Part 724 may be 3 bytes in size. The OUI Index 732 is used for a table lookup on an OUI table 740. The OUI table 740 includes a first column 742 for OUI values and a second column 744 with corresponding OUI Index values. In some examples, the OUI table 740 may be indexed and/or keyed based on OUI values in the first column 742. In some examples, the OUI table 740 may be indexed and/or keyed based on OUI Index values in the second column 744. The OUI table 740 may include one or more OUI table entries with an OUI value (e.g., $OUI_i$) and a corresponding OUI Index value (e.g., OUI Index). The OUI Index 732 may be matched to an OUI Index value in an OUI table entry and a corresponding OUI value retrieved. In some examples, the OUI table entries may have been inserted during one or applications of the process 240 and/or the process 640. In some examples, the OUI table 740 may be the OUI table 320 and/or the OUI table 530. As shown in FIG. 7, the OUI Index 732 is matched to an ith entry 746 of the OUI table 740.

The OUI retrieved from the OUI table entry 746 and the MAC Part 734 are combined to form a MAC address 750. The MAC address 750 includes an OUI 752 and a MAC Part 754. In some examples, the OUI 754 may be the $OUI_i$, and the MAC Part 754 may be the MAC Part 734. In some examples, one or more of the $OUI_i$, and the MAC Part 734 may be concatenated before forming the MAC address 750.

Figure 8:
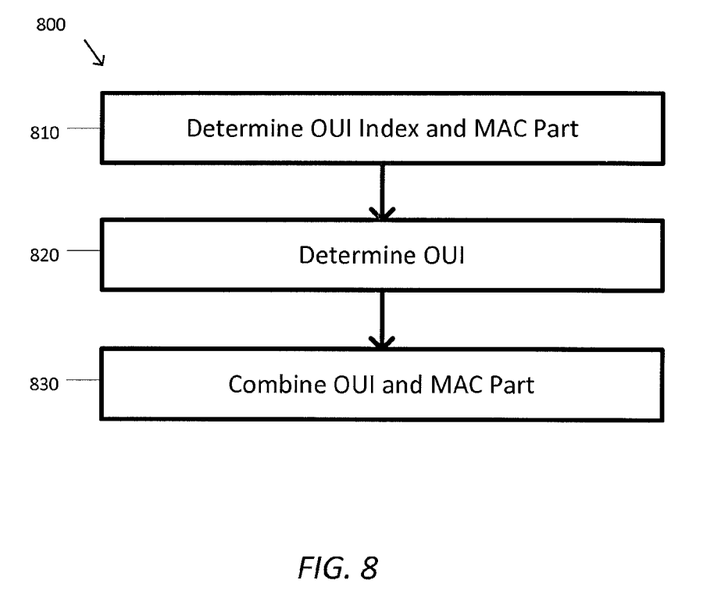
FIG. 8 is a simplified diagram of a method of resolving a MAC address from an IP address using an OUI Index according to some embodiments.

FIG. 8 is a simplified diagram of a method 800 of resolving a MAC address from an IP address using an OUI Index according to some embodiments. As shown in FIG. 8, the method 800 includes a process 810 for determining an OUI Index and a MAC Part, a process 820 for determining an OUI, and a process 830 for combining the OUI and the MAC Part According to certain embodiments, the method 800 of resolving a MAC address from an IP address using an OUI Index can be performed using variations among the processes 810-830 as would be recognized by one of ordinary skill in the art. In some embodiments, one or more of the processes 810-830 of method 800 may be implemented, at least in part, in the form of executable code stored on non-transient, tangible, machine readable media that when run by one or more processors (e.g., one or more processors in a network switching unit) may cause the one or more processors to perform one or more of the processes 810-830.

At the process 810, an OUI Index and a MAC Part are determined. In some examples, an IP address may be used to lookup the OUI Index and the MAC Part in a L3 table. In some examples, the OUI Index may be less than 3 bytes in size. In some examples, a number of bits used to represent the OUI Index may be configurable. In some examples, the MAC Part is a last 3 bytes of the 48 BIT MAC address. In some examples, the IP address may be the IP value 712, the OUI Index may be the OUI Index 732, and the MAC Part may be the MAC Part 734. In some examples, the L3 table may be maintained for use for ARP.

At the process 820, the OUI is determined. In some examples, the OUI Index determined during the process 810 may be used to lookup the OUI in an OUI table. In some examples, the OUI may be the OUI Index 752, and the OUI table may be the OUI table 740.

At the process 830, the OUI and the MAC Part are combined. In some examples, the OUI and the MAC Part are combined to form a MAC address. In some examples, the MAC address may be the MAC address 750.

According to some embodiments, the method 800 may require more time to complete when compared to MAC address resolution when an OUI Index is not used. In some examples, the additional time may be required due to an amount of time to determine the OUI during the process 820. In some examples, the additional time may be relatively minor when compared to a time necessary to transmit network traffic when the network traffic is forwarded. In some examples, the additional time is reduced by implementing the process 820 using hardware. In some examples, the hardware may include a CAM implementing the OUI table.

Figure 9:
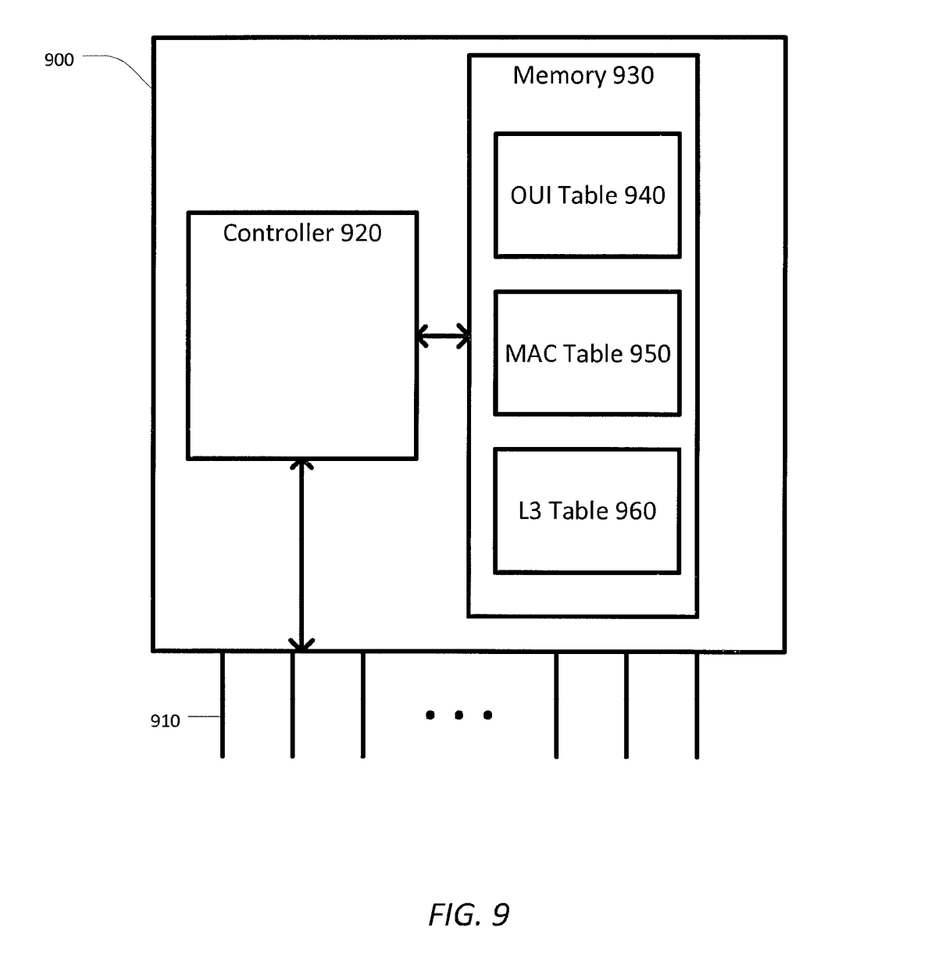
FIG. 9 is a simplified diagram of a network device according to some embodiments.

FIG. 9 is a simplified diagram of a network device 900 according to some embodiments. As shown in FIG. 9, the network device 900 is coupled to other network devices using one or more network links 910. In some examples, the network device 900 may be a network switching unit. In some examples, the network device 900 may be a router. The network device 900 includes a controller 920 and a memory 930. According to some embodiments, the controller 920 may be used to make forwarding decisions for network traffic being handled by the network device 900. According to some embodiments, the controller 920 may use one or more protocols to communicate with the other network devices using the one or more network links 910. According to some embodiments, the controller 920 may include one or more processors. The memory 930 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

The network device 900 further includes an OUI table 940, a MAC table 950, and a L3 table 960. In some examples, the OUI table 940 may be the OUI table 320, the OUI table 530, the OUI table 740, and/or the OUI table 920. In some examples, the OUI table 940 may be stored in the memory 930. In some examples, the OUI table 940 may be stored in a CAM. In some examples, the MAC table 950 may be the MAC table 340. In some examples, the MAC table 950 may be stored in the memory 930. In some examples, the MAC table 950 may be stored in a CAM. In some examples, the L3 table 960 may be the L3 able 720 and/or the L3 table 940. In some examples, the L3 table 960 may be stored in the memory 930. In some examples, the L3 table 960 may be stored in a CAM.

As discussed above and further emphasized here, FIG. 9 is merely an example, which should not unduly limit the scope of the claims. One of ordinary skill in the art would recognize may variations, alternatives, and modifications. According to some embodiments, other architectures are possible for the networking device 900. In some examples, the OUI table 940, the MAC table 950, and the L3 table 960 may each be stored in different memories. In some examples, the MAC table 950 and/or the L3 table 960 may be omitted. In some examples, the OUI table 940, the MAC table 950, and the L3 table 960 may be stored outside the networking device 900. In some examples, some or all of the memory 930 may be included in the controller 920.

Some embodiments of the network device 900 may include non-transient, tangible, machine readable media that include executable code that when run by one or more processors may cause the one or more processors to perform the processes of methods 200, 400, 600, and/or 800 as described above. Some common forms of machine readable media that may include the processes of methods 200, 400, 600, and/or 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of forwarding information toward a destination based on an IP address, the method comprising:
identifying an organizationally unique identifier (OUI) index based on the IP address by performing a lookup on a reduced size L3 table with the IP address, the reduced size L3 table having one or more L3 table entries, wherein each one of the one or more L3 table entries stores a respective MAC address using a respective OUI index, each respective OUI index having a first data size smaller than a second data size of a respective OUI corresponding to a hashed version of the respective OUI index;
determining an OUI based on the OUI index;
determining a MAC address based at least in part on the OUI; and
transmitting data to the MAC address.

2. The method of claim 1, wherein determining the OUI comprises performing a table lookup on an OUI table.

3. The method of claim 2, wherein the OUI table is stored in a content addressable memory.

4. The method of claim 2, wherein the OUI table is indexed based on the OUI index.

5. The method of claim 1, wherein the first data size is less than 3 bytes.

6. The method of claim 1, wherein the first data size is six bits or less.

7. The method of claim 1, wherein the first data size is user configured.

8. A non-transitory computer-readable medium having stored thereon machine-readable instruction executable to cause a machine to perform operations comprising:

identifying an organizationally unique identifier (OUI) index based on a IP address by performing a lookup on a reduced size L3 table with the IP address, the reduced size L3 table having one or more L3 table entries, wherein each one of the one or more L3 table entries stores a respective MAC address L3 table not using a respective OUI index, each respective OUI index having a first data size smaller than a second data size of a respective OUI corresponding to a hashed version of the respective OUI index;

determining an OUI based on the OUI index;

determining a MAC address based at least in part on the OUI; and transmitting data to the MAC address.

9. The non-transitory computer-readable medium of claim 8, wherein determining the OUI comprises performing a table lookup on an OUI table.

10. The non-transitory computer-readable medium of claim 9, wherein the OUI table is stored in a content addressable memory.

11. The non-transitory computer-readable medium of claim 9, wherein the OUI table is indexed based on the OUI index.

12. The non-transitory computer-readable medium of claim 8, wherein the first data size is 6 bits or less.

13. The non-transitory computer-readable medium of claim 8, wherein the first data size is user configured.

14. An information handling system comprising:

one or more processors coupled to a hardware memory, the one or more processors reading instructions from the hardware memory to cause the system to perform operations comprising:

identifying an organizationally unique identifier (OUI) index based on a IP address by performing a lookup on a reduced size L3 table with the IP address, the reduced size L3 table having one or more L3 table entries, wherein each one of the one or more L3 table entries stores a respective MAC address using a respective OUI index, each respective OUI index having a first data size smaller than a second data size of a respective OUI corresponding to a hashed version of the respective OUI index;

determining an OUI based on the OUI index;

determining a MAC address based at least in part on the OUI; and transmitting data to the MAC address.

15. The information handling system of claim 14, wherein determining the OUI comprises performing a table lookup on an OUI table.

16. The information handling system of claim 15, wherein the OUI table is held in content addressable memory.

17. The information handling system of claim 14, wherein the first data size is less than 3 bytes.

18. The information handling system of claim 14, wherein the first data size is 6 bits or less.

19. The information handling system of claim 14, wherein the first data size is user configured.

* * * * *